United States Patent
De La Vega et al.

(10) Patent No.: US 10,984,920 B2
(45) Date of Patent: Apr. 20, 2021

(54) STABLE DISPERSIONS OF MONOCRYSTALLINE NANOMETRIC SILVER PARTICLES

(71) Applicant: P.V. NANO CELL LTD., Migdal HaEmek (IL)

(72) Inventors: Fernando De La Vega, Zichron Yaakov (IL); Ganit Shter Bar Joshua, Haifa (IL); Semyon Melamed, Kiryat Yam (IL); Reuven Geva, Nofit (IL); Moshe Link, Haifa (IL)

(73) Assignee: P.V. Nano Cell Ltd., Migdal Haemek (IL)

(*) Notice: Subject to any disclaimer, the term of this patent is extended or adjusted under 35 U.S.C. 154(b) by 0 days.

(21) Appl. No.: 15/412,124

(22) Filed: Jan. 23, 2017

(65) Prior Publication Data

US 2017/0128900 A1 May 11, 2017

Related U.S. Application Data

(63) Continuation of application No. 13/991,905, filed as application No. PCT/US2011/063459 on Dec. 6, 2011, now Pat. No. 9,556,350.

(30) Foreign Application Priority Data

Dec. 6, 2010 (GB) ..................... 1020556

(51) Int. Cl.
*H01B 1/22* (2006.01)
*B22F 1/00* (2006.01)
(Continued)

(52) U.S. Cl.
CPC ............ *H01B 1/22* (2013.01); *B22F 1/0022* (2013.01); *B22F 9/24* (2013.01); *B82Y 30/00* (2013.01);
(Continued)

(58) Field of Classification Search
CPC .. B01F 17/0007; B01F 17/005; B22F 1/0022; B22F 9/24; B22F 2009/245;
(Continued)

(56) References Cited

U.S. PATENT DOCUMENTS 7,621,976 B2  11/2009  Hampden-Smith et al.
7,655,161 B2   2/2010  Cho et al.
(Continued)

FOREIGN PATENT DOCUMENTS

CN       1935422        3/2007
JP    2001278714       10/2001
(Continued)

OTHER PUBLICATIONS

Wiley et al., "Polyol Synthesis of Silver Nanoparticles: Use of Chloride and Oxygen to Promote the Formation of Single-Crystal, Truncated Cubes and Tetrahedrons", NANO Letters 2004, vol. 4, No. 9, pp. 1733-1739.

(Continued)

*Primary Examiner* — Matthew R Diaz
(74) *Attorney, Agent, or Firm* — Daniel Feigelson

(57) ABSTRACT

A concentrated dispersion of nanometric silver particles, and a method of producing the dispersion, the dispersion including a first solvent; a plurality of nanometric silver particles, in which a majority are single-crystal silver particles, the plurality of nanometric silver particles having an average secondary particle size ($d_{50}$) within a range of 30 to 300 nanometers, the particles disposed within the solvent; and at least one dispersant; wherein a concentration of the silver particles within the dispersion is within a range of 30% to 75%, by weight, and wherein a concentration of the dispersant is within a range of 0.2% to 30% of the concentration of the silver particles, by weight.

20 Claims, 4 Drawing Sheets

(51) Int. Cl.
  *B22F 9/24* (2006.01)
  *B82Y 30/00* (2011.01)
  *C09D 11/52* (2014.01)

(52) U.S. Cl.
  CPC ........ *C09D 11/52* (2013.01); *B22F 2009/245* (2013.01); *B22F 2301/255* (2013.01)

(58) Field of Classification Search
  CPC ........... B22F 2301/255; B22F 2998/10; B82Y 30/00; C09D 11/52; G03C 1/8255; H01B 1/22; H01B 1/16; B01J 13/0043
  USPC ....................................................... 252/500
  See application file for complete search history.

(56) References Cited

U.S. PATENT DOCUMENTS

| | | |
|---|---|---|
| 2003/0185889 A1 | 10/2003 | Yan |
| 2007/0056402 A1 | 3/2007 | Cho et al. |
| 2007/0290175 A1* | 12/2007 | Kim ..................... B22F 1/0018 252/500 |
| 2009/0053400 A1 | 2/2009 | De La Vega et al. |
| 2009/0214766 A1* | 8/2009 | Magdassi .............. B22F 1/0018 427/125 |
| 2009/0263496 A1* | 10/2009 | Kijlstra ................ B01J 13/0043 424/600 |
| 2010/0101637 A1 | 4/2010 | Yamasaki et al. |
| 2010/0252784 A1* | 10/2010 | Boll ........................ C09D 5/24 252/514 |

FOREIGN PATENT DOCUMENTS

| | | |
|---|---|---|
| JP | 2006328472 | 12/2006 |
| WO | 2010/011841 A2 | 1/2010 |
| WO | 2010/069895 A1 | 6/2010 |

OTHER PUBLICATIONS

Chen et al., "study on the synthesis of silver nanowires with adjustable diameters through the polyol process", Nanotechnology 17 (2006) pp. 3933-3939, Jul. 11, 2006.

Wang et al., "A facile route to well-dispersed single-crystal silver nanoparticles from AgSO3 in water", Journal of alloys and compound, 509 (2011) pp. 7515-7518, Apr. 27, 2011.

* cited by examiner

STABLE DISPERSIONS OF MONOCRYSTALLINE NANOMETRIC SILVER PARTICLES

This application is a continuation of U.S. Ser. No. 13/991,905, filed Jul. 7, 2013, which is the national phase of PCT/US2011/063459, filed Dec. 6, 2011, which claims priority from GB 1020556.5, filed Dec. 6, 2010. The contents of the aforesaid applications are incorporated herein by reference.

FIELD AND BACKGROUND OF THE INVENTION

The present invention relates to stable, concentrated dispersions of nanometric silver particles, and to a method of producing such dispersions.

Nanometric silver particles are seeing increasing use in the pharmaceutical industry, especially in the field of wound management. Dispersions of fine silver particles are widely used in the manufacture of conductive inks and electrically conductive films for applications such as internal electrodes in multi-layer capacitors, interconnections in multi-chip components, conductive lines in defoggers and deicers, photovoltaic modules, resistors, inductors, antennas, membrane switches, electromagnetic shielding, thermally conductive films, light reflecting films, and conducting adhesives. In many existing and emerging technologies, demand for ultrafine silver particles having specific properties is increasing.

In some applications, required features of such particles may relate to at least one of: average particle size, narrow particle size distribution, particle density, and crystalline grain structure.

Nanometric silver particles have seen commercial use as dispersions in organic solvents. The stability of such dispersions may typically be guaranteed for up to six months.

The production of fine silver particles by precipitation of the particles from a liquid medium is well known. However, as taught by U.S. Pat. No. 6,277,169 to Hampden-Smith, et al., such liquid precipitation techniques are often difficult to control to produce particles having the desired characteristics. Specifically, U.S. Pat. No. 6,277,169 discloses that it is especially difficult by the liquid precipitation route to obtain particles having dense, spherical particle morphology and good crystallinity.

The production of small silver particles by reducing silver oxide (e.g., using hydrogen peroxide) in aqueous liquid media is known. The sparingly soluble silver oxide may be dissolved in the reaction media prior to the reduction reaction by complexing the silver ions with ammonia, as disclosed by WO Patent Publication No. 2003/080231.

Various liquid precipitation techniques may promote agglomeration or aggregation of the silver particles, as well as particle sedimentation. Such agglomeration may be undesirable for many reasons, among them: the particle size distribution and mean particle size may be deleteriously affected, and contaminants in the mother liquor may be occluded between particles, reducing product purity. We have found that the specific electric resistivity of thin films formed from such contaminated silver particles may disadvantageously be increased. Also agglomerated particles and/or sedimentation may clog the nozzles in ink jet printing heads, detracting from the robustness of the printing process.

Various liquid precipitation techniques may promote the formation of polycrystalline silver particles. We have found that such polycrystalline silver particles may disadvantageously exhibit a higher specific electric resistivity. Moreover, they may display an appreciably higher propensity to agglomeration and to sedimentation.

The advances in the production of silver nanoparticles notwithstanding, the present inventors have recognized a need for improved silver nanoparticles and silver nanoparticle dispersions, and for methods of producing such nanoparticles and dispersions thereof.

SUMMARY OF THE INVENTION

We have found that chemical reduction in an aqueous medium, according to the present invention, may have the greatest potential for industrial scale production of concentrated nanometric silver particle dispersions (of up to 75%, by weight) that may display superior stability (24 months or more) and may also enable the production of thin silver films having extremely low specific electric resistivity (e.g., 2.5× $10^{-6}$ ohm·cm or less). However, various additional processing steps may be required to ensure that the nanometric silver particles produced, typically as dilute dispersions, do not undergo disadvantageous agglomeration and other transformations as the concentration of the dispersion is increased, and as the washing and solvent displacement are effected.

According to teachings of the present invention there is provided a concentrated dispersion of nanometric silver particles, including a first solvent; a plurality of nanometric silver particles, in which a majority are single-crystal silver particles, the plurality of nanometric silver particles having an average secondary particle size ($d_{50}$) within a range of 30 to 300 nanometers, the particles disposed within the solvent; and at least one dispersant, wherein a concentration of the silver particles within the dispersion is within a range of 30% to 75%, by weight, and wherein a concentration of the dispersant is within a range of 0.2% to 30% of the concentration of the silver particles, by weight.

According to further features in the described preferred embodiments, the dispersant concentration is at most 20%, 15%, 10%, 7%, 5%, 3%, or 2%.

According to still further features in the described preferred embodiments, the viscosity of the dispersion, at 25° C., is less than 2000 cP, 1000 cP, 600 cP, 300 cP, or 120 cP, and in many cases, less than 80 cP, 60 cP, 45 cP, 35 cP, 25 cP, or 20 cP.

According to still further features in the described preferred embodiments, the average secondary particle size is at least 40 nanometers, at least 50 nanometers, at least 60 nanometers, or at least 75 nanometers.

According to still further features in the described preferred embodiments, at least 60%, at least 70%, at least 75%, at least 80%, at least 85%, or at least 90% of the nanometric silver particles are single-crystal silver particles.

According to still further features in the described preferred embodiments, the average secondary particle size is at most 250 nanometers, at most 200 nanometers, at most 150 nanometers, at most 120 nanometers, at most 100 nanometers, or at most 80 nanometers.

According to still further features in the described preferred embodiments, the at least one dispersant is selected from the group of dispersants consisting of a polyvinylpyrrolidone (PVP), gum arabic, polyvinyl alcohol (PVA), polyacrylic acid (PAA), polyallylamine (PAAm), polysodium styrene sulfonate (PSS), 3-(aminopropyl)trimethoxysilane (APS), a fatty acid, lauryl amine, cetyltrimethylammonium bromide (CTAB), and tetraoctylammonium bromide (TOAB).

According to still further features in the described preferred embodiments, the dispersant includes PVP. The average molecular weight of the PVP is at least 8,000 gram/mole, at least 10,000 gram/mole, within a range of 10,000 gram/mole to 1,600,000 gram/mole, or within a range of 10,000 gram/mole to 200,000 gram/mole.

According to still further features in the described preferred embodiments, the first solvent includes, substantially consists of, or consists of water.

According to still further features in the described preferred embodiments, the first solvent includes an alcohol.

According to still further features in the described preferred embodiments, the concentration of water within the dispersion is less than 25%, less than 15%, less than 10%, less than 7%, less than 5%, less than 3%, or less than 2%, by weight.

According to still further features in the described preferred embodiments, the first solvent includes at least one volatile organic solvent.

According to still further features in the described preferred embodiments, the first solvent includes at least one non-volatile organic solvent.

According to still further features in the described preferred embodiments, the first solvent includes at least one volatile organic solvent and at least one non-volatile organic solvent.

According to still further features in the described preferred embodiments, the first solvent includes water and at least one volatile organic solvent, and wherein the volatile organic solvent makes up at least 80%, at least 85%, or at least 90% of the first solvent, by weight.

According to still further features in the described preferred embodiments, the specific electrical resistivity of the silver particles, after standard sintering, is at most $4\times10^{-5}$ ohm·cm, $6\times10^{-6}$ ohm·cm, at most $5\times10^{-6}$ ohm·cm, at most $4\times10^{-6}$ ohm·cm, at most $3.5\times10^{-6}$ ohm·cm, at most $3\times10^{-6}$ ohm·cm, or at most $2.5\times10^{-6}$ ohm·cm.

According to still further features in the described preferred embodiments, the dispersion contains at least 35%, at least 40%, at least 45%, at least 50%, or at least 55%, by weight, nanometric silver particles.

According to still further features in the described preferred embodiments, the secondary particle size of at least 90% of the particles, by volume ($d_{90}$), is at most 500 nanometers, at most 300 nanometers, at most 200 nanometers, at most 150 nanometers, at most 120 nanometers, at most 100 nanometers, at most 80 nanometers, or at most 70 nanometers.

According to still further features in the described preferred embodiments, the average molecular weight of the dispersant is at least 8,000 gram/mole, within a range of 10,000 gram/mole to 1,600,000 gram/mole, or within a range of 10,000 gram/mole to 200,000 gram/mole.

According to still further features in the described preferred embodiments, the first solvent includes at least one solvent selected from the group of solvents consisting of an alcohol, dimethyl sulfoxide (DMSO), an alkylamine; ethylene diamine, dimethyl acetamide, 1,4-butanediol, formic acid, acetic acid, a glycol or glycol derivative, N-methyl-2-pyrrolidone (NMP), butyl carbitol acetate, and an epoxy resin.

According to still further features in the described preferred embodiments, the glycol includes at least one of ethylene glycol, diethyleneglycol, triethyleneglycol, propylene glycol, dipropyleneglycol, and tripropyleneglycol.

According to still further features in the described preferred embodiments, the glycol derivative includes at least one of dipropylene glycol monomethyl ether (DPM), tripropylene glycol methyl ether (TPM), and diethylene glycol monomethyl ether (DGME).

According to still further features in the described preferred embodiments, the alcohol includes at least one of ethanol, isopropanol, benzyl alcohol, and terpineol.

According to still further features in the described preferred embodiments, the alkylamine includes butylamine.

According to still further features in the described preferred embodiments, the dispersion contains less than 70%, by weight, nanometric silver particles.

According to still further features in the described preferred embodiments, the inventive dispersion is produced according to a process including the steps of: (a) reacting at least one soluble silver compound with an alkali metal hydroxide in an aqueous medium, in a presence of a first dispersant, to produce silver oxide solids having an average secondary particle size below 1200 nanometers; (b) reacting the silver oxide solids with at least one reducing agent in an aqueous medium, in a presence of a second dispersant, to produce silver particles, the silver particles having an average secondary particle size below 1000 nanometers; and (c) providing the silver particles in the concentrated dispersion, the concentration of the nanometric silver particles being within a range of 30% to 75%, by weight.

According to still further features in the described preferred embodiments, the reducing agent includes, or consists substantially of, a reducing agent selected from the group consisting of peroxides and sodium borohydride.

According to still further features in the described preferred embodiments, the reducing agent includes, or consists substantially of, hydrogen peroxide.

According to still further features in the described preferred embodiments, at least one of the first and second dispersants includes PVP.

According to still further features in the described preferred embodiments, the second dispersant is added in sufficient quantity whereby the silver particles have an average secondary particle size of at most 250 nanometers, at most 200 nanometers, at most 150 nanometers, at most 100 nanometers, or at most 80 nanometers.

According to still further features in the described preferred embodiments, the first dispersant is added in sufficient quantity whereby the silver oxide solids have an average secondary particle size of at most 200 nanometers.

According to still further features in the described preferred embodiments, the alkali metal hydroxide and the soluble silver compound react in a stoichiometric ratio of hydroxide to soluble silver compound, and wherein quantities of the alkali metal hydroxide and the soluble silver compound are added in a particular ratio that is, at most, 1.2 times, 0.98 times, or 0.95 times the stoichiometric ratio.

According to still further features in the described preferred embodiments, subsequent to step (b), the silver particles are washed and concentrated, whereby the aqueous medium is only partially removed from the particles (up to 90%, up to 80%, up to 75%, or up to 70%) to form a concentrate.

According to another aspect of the present invention there is provided a method for producing a dispersion of nanometric silver particles, the method including: (a) reacting at least one soluble silver compound with an alkali metal hydroxide in an aqueous medium, in a presence of a first dispersant, to produce silver oxide solids having an average secondary particle size below 1200 nanometers; (b) reacting the silver oxide solids with at least one reducing agent in an aqueous medium, in a presence of a second dispersant, to produce a first dispersion of silver particles, the silver particles having an average secondary particle size below 300 nanometers; and (c) removing at least a portion of the aqueous medium from the particles to produce the dispersion.

According to further features in the described preferred embodiments, the method further includes concentrating the particles to form a second dispersion, concentrated with respect to the first dispersion.

According to still further features in the described preferred embodiments, the second dispersion has a concentration of at least 10%, and less than 75%, by weight.

According to still further features in the described preferred embodiments, step (c) includes washing and concentrating the silver particles, whereby the aqueous medium is partially removed from the particles, to form a concentrate containing most of the silver particles.

According to still further features in the described preferred embodiments, the method further includes replacing most of the aqueous medium by at least one volatile organic solvent.

According to still further features in the described preferred embodiments, the method further includes replacing most of the volatile organic solvent by at least one additional organic solvent.

According to still further features in the described preferred embodiments, the concentration of the nanometric silver particles within the dispersion is within a range of 30% to 75%, by weight.

According to still further features in the described preferred embodiments, the dispersion having any of the above-described characteristics has been aged for at least 6 months, at least 9 months, at least 12 months, at least 18 months, or at least 24 months.

According to still further features in the described preferred embodiments, the reacting of the silver oxide solids is performed in the presence of the second dispersant, an excess of which is removed in step (c).

BRIEF DESCRIPTION OF THE FIGURES

The foregoing discussion will be understood more readily from the following detailed description of the invention, when taken in conjunction with the accompanying FIGS. 1-6), in which.

DESCRIPTION OF THE PREFERRED EMBODIMENTS

Figure 1:
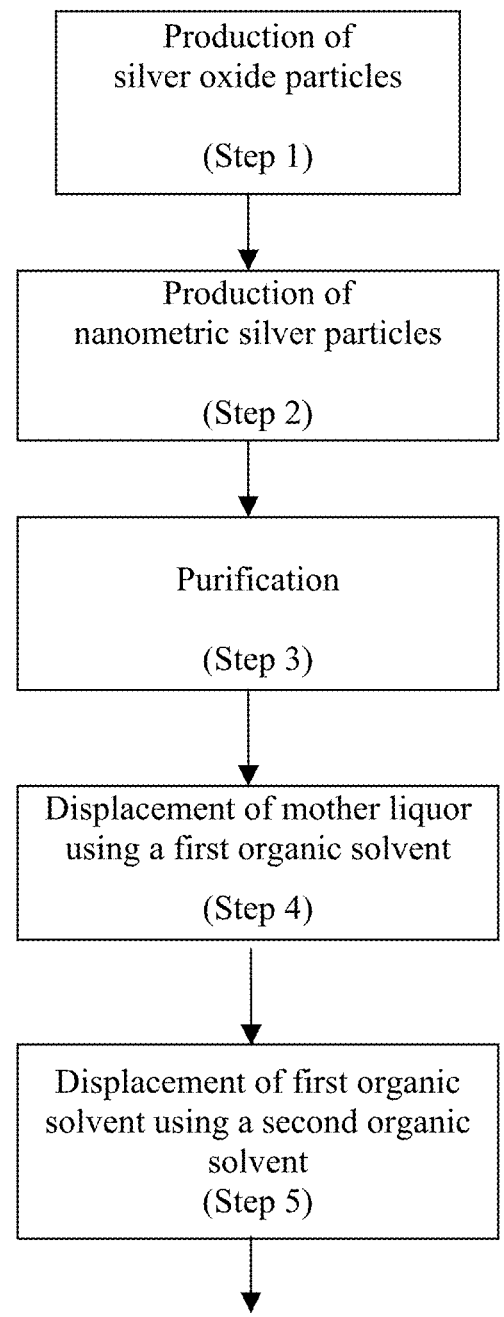
FIG. 1 is a schematic block diagram of a process for producing a nanometric silver product, according to one aspect of the present invention.

The principles of the inventive stable dispersions of nanometric silver particles, and the inventive methods of producing such dispersions, may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

We have discovered a method of producing nanometric silver particles in which a large fraction of the particles is monocrystalline. However, we have found the production of stable dispersions of these nanometric silver particles to be an extremely complex, and sometimes counterintuitive, matter. The production of stable dispersions may be particularly problematic when producing such dispersions directly in various organic solvents that may be used in the final product dispersions. In addition, the production of stable dispersions from pre-made (e.g., commercially available) nanometric silver particles has also been found to be extremely difficult and unpredictable.

These challenges notwithstanding, we have surprisingly discovered a method of purifying such nanometric silver particles while maintaining a stable dispersion, whereby monocrystalline nanometric silver particles retain their monocrystalline nature, even during contact or displacement with those problematic organic solvents, and during the formulation of concentrated dispersions having at least 30% silver, by weight, and more typically, at least 35%, at least 40%, at least 45%, at least 50%, or at least 55% silver by weight.

Moreover, the inventive method may advantageously produce concentrated dispersions containing, mostly or predominantly monocrystalline silver particles having an average particle size of at least 30 nanometers, and more typically, at least 40 nanometers, at least 50 nanometers, at least 60 nanometers, or at least 75 nanometers. We believe that the monocrystallinity of the silver particles is a decisive factor in attaining, after sintering, low specific electric resistivity values. We further believe that the monocrystallinity of the silver particles enables the formulation of highly concentrated dispersions of silver nanoparticles, without undergoing appreciable agglomeration.

Typically, the concentrated dispersions produced contain, at most, 10% ultrafine particles, by weight. Thus, the concentrated dispersions of the present invention may have a $d_{10}$ of at least 20 nanometers or at least 25 nanometers, and more typically, at least 30 nanometers, at least 35 nanometers, or at least 40 nanometers.

Although it may be possible to produce silver monocrystals according to other methods, the dispersions of the present invention may be distinguished in at least one of several ways, including:

1. average particle size
2. fines fraction ($d_{10}$)

3. concentration of the silver particles within the dispersion 4. percentage of monocrystals within the silver particles, by weight.

1. Average Particle Size

In the concentrated dispersions of the present invention, the nanometric silver particles having an average secondary particle size ($d_{50}$) within a range of 30 to 300 nanometers. These dispersions contain, mostly or predominantly monocrystalline silver particles.

It must be emphasized that the production of a monocrystal having a diameter of 60 nanometers is over 200 times the size of a monocrystal having a diameter of 10 nanometers [$60/10)^3 = 216$]. The growth of a monocrystal from a diameter of 10 nanometers to 60 nanometers within a solvent requires over 200 times the deposition of supersaturated silver onto a 10 nanometer monocrystal, than was require to initially form the 10 nanometer monocrystal.

In crystallization processes, competing mechanisms, including nucleation and agglomeration, may interfere, or even predominate, with respect to crystal growth. In the case of reactive precipitation processes, in which sparingly soluble materials and the like are precipitated out of solution in a reactive process, these competing processes may be greatly favored, particularly in view of the extremely high global supersaturation levels, and even higher local supersaturation levels. These competing processes may further be favored due to the presence of solid reactant particles, around which the local supersaturation may be even higher, favoring nucleation and agglomeration over crystal growth. In the methods of the present invention, the silver particles are precipitated out of solution in such a reactive process. Hence, the production of silver particles that are mostly or predominantly monocrystalline silver particles would appear to be, at the very least, unexpected. The production of a monocrystalline silver product having a $d_{50}$ of 30 nanometers, and typically more, is surprising.

2. Fines Fraction ($d_{10}$)

The silver particles in the dispersions of the present invention may be further characterized by the paucity of fine silver particles. Using a Brookhaven 90 Plus particle size analyzer, the dispersions of the present invention exhibited a $d_{10}$ of at least 25 nanometers, and more typically, at least 30 nanometers, at least 35 nanometers, and in some cases, at least 40 nanometers. The data from the Brookhaven particle size analyzer was subsequently confirmed by measurements based on High Resolution Scanning Electron Microscopy (HRSEM) images.

Thus, at least 90%, by weight, of the silver particles in the dispersions of the present invention have a diameter of at least 25-40 nanometers.

3. Concentration of the Silver Particles Within the Dispersion

The concentration of nanometric silver particles within the concentrated dispersions of the present invention is typically within a range of 30% to 75%, by weight. The production of the nanoparticles is typically performed whereby a relatively dilute dispersion is obtained. The workup of the dilute dispersion, which may include washing, solvent addition and/or replacement, etc., may be a major contributor to the agglomeration of silver nanoparticles. In the inventive process, described hereinbelow, the agglomeration of the silver nanoparticles is largely averted.

4. Percentage of Monocrystals Within the Silver particles, by Weight

In the concentrated dispersions of the present invention, the nanometric silver particles may be mostly or predominantly monocrystalline silver particles, on a weight basis. The presence of monocrystals was qualitatively demonstrated by means of Electron Back Scattered Diffraction (EBSD). Quantification of the results was achieved by performing a plurality of scans at randomly chosen points, as described in greater detail hereinbelow. We have found that in our inventive dispersions, at least 50% or at least 70% of the nanometric silver particles are monocrystalline, and more typically, at least 80% or at least 90% are monocrystalline.

Referring now to the drawings, FIG. 1 is a schematic block diagram of a method of producing a nanometric silver product, according to one aspect of the present invention. The method may include the following steps:

Step 1: reacting at least one soluble silver compound with an alkali metal hydroxide in an aqueous medium, in a presence of a first dispersant, to produce silver oxide solids having an average secondary particle size below 1200 nanometers;

Step 2: reacting the silver oxide solids with at least one reducing agent in an aqueous medium, in a presence of a second dispersant, to produce silver particles, the silver particles having an average secondary particle size below 500 nanometers, and more typically, below 300 nanometers;

Step 3: purifying the silver particles of Step 2 by washing with water; the aqueous medium may also be partially removed from the particles, to form a concentrate containing most of the silver particles;

Step 4: introducing, to the purified silver particles, at least one volatile organic solvent, and replacing most of the aqueous medium therewith; and Step 5: replacing most of the volatile organic solvent by at least one, typically non-volatile, organic solvent.

Various embodiments of the inventive method of producing a nanometric silver product will now be described in further detail.

Step 1

At least one soluble silver compound is dissolved in an aqueous solvent to form a first solution. The alkaline hydroxide (e.g., sodium or potassium hydroxide) may then be added, under vigorous stirring to this first solution. However, it may be advantageous to prepare a second solution of the alkaline hydroxide. The second solution may then be introduced to the first solution, under vigorous stirring, and in the presence of a dispersant, to form a fine silver oxide precipitate. The resulting dispersion is preferably agitated, and an anti-foaming agent may be added to prevent or reduce foaming.

The vigorous mixing may be effected in an ultrasonic bath, typically maintained within a temperature range of 10° C. to 35° C.

Various and varied dispersants may be used to contribute to the quality of the inventive nanometric silver product, including polyvinylpyrrolidone (PVP), gum arabic, polyvinyl alcohol (PVA), polyacrylic acid (PAA), polyallylamine (PAAm), polysodium styrene sulfonate (PSS), 3-(aminopropyl)trimethoxysilane (APS), fatty acids, such as stearic, palmitic, lauric etc.; lauryl amine, cetyltrimethylammonium bromide (CTAB), tetraoctylammonium bromide (TOAB).

The use of PVP has been found to be particularly advantageous. While PVP having an average molecular weight of up to about 2,000,000 gram/mole may be used, we have found to be particularly effective, in most cases, PVP molecules having an average molecular weight higher than about 8,000 gram/mole, and more typically, an average molecular weight within the range of 10,000 gram/mole to 200,000 gram/mole. The weight ratio of the PVP to the silver particles, in Step 1, is typically within the range of 0.01 to 10, and more typically, within the range of 0.1 to 5.

An anti-foaming agent may be introduced to control foaming in any of the process steps, as necessary.

Step 2

A reducing agent may be added, under vigorous mixing, to a dispersion containing fine silver oxide particles, whereby the oxide particles are reduced, producing a second dispersion containing nanometric silver particles. The presence of a dispersant in Step 2 may reduce or substantially inhibit agglomeration. The dispersant may be the previously added dispersant from Step 1, or may be a mixture of the previously added dispersant from Step 1 and a newly added dispersant. The newly added dispersant may be identical to the dispersant used in Step 1, or may be a different chemical species.

The vigorous mixing may be effected in an ultrasonic bath, typically maintained within a temperature range of 10° C. to 35° C.

We have found that in producing the dispersion of nanometric silver particles of the present invention, it may be essential to reduce freshly precipitated silver oxide solids, which have been precipitated in the presence of a suitable dispersant, as described in Step 1. In our attempts to circumvent Step 1 by using commercially available silver oxide solids as raw material for Step 2, the dispersions of nanometric silver particles had different and generally disadvantageous physical properties with respect to those obtained by the methods of the present invention. We have found this to be the case even when a suitable dispersant is pre-introduced to the reaction mixture (containing the commercially available silver oxide solids) of Step 2.

Preferably, the reduction reaction is conducted within an ambient temperature range (typically between 10° C. and 35° C.) to obtain the desired dispersion of nanometric silver particles. However, the reduction reaction temperature may be allowed to rise to about 60° C. without adversely affecting the resulting product properties. We note that within this temperature range, an alcohol (such as ethanol or ethylene glycol) is incapable of converting the silver ions into silver (0), such that the reduction is accomplished solely by the reducing agent or agents.

These reducing agents may include a peroxide, ascorbic acid, sugars such as glucose, metal hydrides such as sodium borohydride, hydrazine hydrate, formaldehyde, and a saccharide, or reducing agents belonging to the chemical families of these reducing agents. Hydrogen peroxide, which may be considered a "green" reagent, in that the decomposition thereof ultimately leads to the formation of water and oxygen, may be a preferred peroxide.

In order to simplify the method of the invention, the dispersant used in Step 1 may be reused as the dispersant for Step 2. Additional dispersants may be introduced in Step 2, including those dispersants mentioned hereinabove with respect to Step 1.

Yield and economic considerations would appear to dictate a stoichiometric ratio of at least 1 to 1 between the alkali hydroxide and the soluble silver salt (such as silver nitrate) reacted in Step 1. In this manner, the yield of the silver oxide intermediate product would be highest. Surprisingly, however, we have discovered that using a stoichiometric excess of alkali hydroxide may ultimately result in heavy agglomeration of the silver particles. In the laboratory, a 50% excess of an alkaline hydroxide (such as potassium hydroxide) with respect to the stoichiometric ratio of hydroxide to soluble silver compounds, resulted in disadvantageous agglomeration of the silver particles. Similar results were obtained for close to a 20% excess of the alkaline hydroxide with respect to the stoichiometric ratio of the alkaline hydroxide to silver nitrate.

We have found advantageous, after a course of lengthy experimentation, to operate Step 1 at a stoichiometric ratio of hydroxide to a soluble silver compound within a narrow range between 0.8 to 1.0, and more typically, between 0.8 to 0.98 or between 0.8 to 0.96. Within this range, the yield of silver is indeed lower, but the yield of high-quality product may be greatly increased.

In Step 2, the concentration of silver particles within the reaction mixture is typically between 0.5% to 5%, by weight, and more typically, between 1% to 3%, by weight.

In addition to water, an additional solvent can be introduced in Step 1 and/or Step 2. Typically, the additional solvent includes a polar solvent such as a polar organic solvent. It is generally advantageous for the additional solvent to be relatively volatile, soluble in water, and to dissolve substantial amounts of the dispersants used.

Preferably, alcohols like methanol, ethanol, and isopropyl alcohol (IPA) can be used as polar solvents. However, various glycols and the like may also be used.

Step 3

Typically, water or an aqueous solvent may be used to purify the resulting dispersion of Step 2 in a suitable purification system. The introduction of water or aqueous solvent to the purification system is controlled to replace the spent aqueous liquor, while maintaining the concentration of the silver particles, at any time, below a preset value (below 90%, by weight, and preferably below 80%, below 70%, or below 60%). As a result, substantially all the salts and most of the dispersant in the aqueous liquor are removed without deleteriously changing the shapes or agglomerating the silver particles.

The aqueous solvent may contain, in addition to water, an organic solvent such as a polar organic solvent. The streams produced in Step 3 typically include a concentrate containing most of the nanometric silver particles, and a relatively dilute stream containing a lower concentration of the silver nano-particles, and preferably, containing substantially none of the silver nano-particles. In Step 3, substantially all of the salts, part of the dispersant, and part of the liquid that are present with the formed silver particles are removed. Usually, particular values of the final concentration of the salts (based on the silver weight), of the dispersant (based on the silver weight), and of the silver particles (based on the dispersion weight) are preset, and the operation of Step 3 is considered finished when these preset values are met.

We have found that Step 3 can be conducted in a microfiltration system such as a membrane purification system having at least one membrane capable of separating the silver particles from the aqueous liquor, without losing a fraction of the silver particles in the aqueous phase that would make the process economically unviable. Alternatively or additionally, Step 3 may be conducted in a centrifuge purification system having at least one centrifuge, such as a decanter centrifuge.

A microfiltration system and method of general relevance to the present invention is disclosed by Pagana et al., "Applied Pilot-Scale Studies on Ceramic Membrane Processes for the Treatment of Wastewater Streams" (Global NEST Journal, Vol. 8, No. 1, pp 23-30, 2006), and is incorporated in its entirety by reference into the specification, as if fully set forth herein.

At least one membrane of the membrane purification system should be capable of filtering off the nanometric silver particles in the dispersion. To this end, the characteristic pore size of this membrane may be within a range that is suitable to retain the nanometric silver particles. The membranes may be made of a metallic material, ceramic material, polymeric material, or of other materials that may be known to those of ordinary skill in the art.

Step 4

A volatile organic solvent may replace most of the aqueous liquor of the purified dispersion obtained in Step 3, in a method similar to the method utilized in Step 3. The same purification system may be used. In displacing the aqueous liquor, a further purification of the silver particles is achieved, which may be essential for various products and applications.

The volatile organic solvent may advantageously be soluble in water, and may readily dissolve the dispersant or dispersants remaining from Step 3. Various solvents may be appropriate as solvents for Step 4 of the process, either alone or mixed with at least one additional solvent. These solvents include, but are not limited to alcohols such as methanol, ethanol, propanol, isopropanol, and a butanol such as 1-butanol; acetonitrile; dimethyl sulfoxide (DMSO); alkylamines such as butylamine; ethylene diamine; dimethyl acetamide; 1,4-butanediol; formic acid; and acetic acid.

Step 5

A second organic solvent, whose identity and properties may be dictated by market requirements, may be used to replace most of, and typically at least 80% of, or at least 90% or 95% of, the volatile organic solvent of the dispersion obtained in Step 4. The method of solvent replacement or displacement may be similar to the method utilized in Step 3 and/or Step 4, and the purification system may be similar or identical.

However, the second organic solvent may replace the volatile organic solvent in an evaporation system in which the volatile organic solvent is evaporated, with a concomitant addition of the desired organic solvent, in order to maintain a concentration of the silver particles below a particular, desired value. Typically the concentration of the silver particles is at most 90%, at most 85%, or at most 80%.

Various solvents may be appropriate as solvents for Step 5 of the process, either alone or mixed with at least one additional solvent. These solvents include, but are not limited to, ethylene glycol and derivates thereof (e.g., diethylene glycol monomethyl ether (DGME), dipropylene glycol (DPG), dipropylene glycol monomethyl ether (DPM), and tripropylene glycol methyl ether (TPM)); N-methyl-2-pyrrolidone (NMP); various alcohols, including ethanol, isopropanol, benzyl alcohol, and terpineol; butyl carbitol acetate; and specific epoxy resins. One appropriate solvent mixture is TPM/NMP, which may typically be used up to a weight ratio of about 85:15.

Various solvents were found to be less suitable or unsuitable for use in Step 5, including acetates such as propylene glycol methyl ether acetate (PMA), which caused agglomeration of the silver particles when used in conjunction with certain dispersants or surfactants.

Thus, by preparing the nanometric silver particles as described in Steps 1 and 2, and by conducting the work-up procedure as described in Steps 3-5, the nanometric silver dispersions of the present invention may achieve exceptional stability (having a guaranteed shelf-life of at least 9 months, and more typically, at least 12 months, at least 18 months or at least 24 months). The inventive dispersions may be characterized by very low specific resistivity values (at most $6 \times 10^{-6}$ ohm·cm, at most $5 \times 10^{-6}$ ohm·cm, at most $4 \times 10^{-6}$ ohm·cm, at most $3.5 \times 10^{-6}$ ohm·cm, at most $3 \times 10^{-6}$ ohm·cm, or at most $2.5 \times 10^{-6}$ ohm·cm), as measured according to ASTM procedure F 390-98 (reapproved 2003).

In another embodiment of the present invention, we have discovered that the first purifying step (Step 3) may advantageously be effected by nano-separation or nano-filtration using nano-separation membranes. Such processes may be excessively and impractically slow when the size of the filtrate species approaches that of the membrane pore or opening. Moreover, nano-filtration membrane processes may even be substantially impossible when the size of the filtrate species equals, or exceeds, the size of the membrane opening. A further, perhaps even more significant determent to using such nano-separation processes relates to the relative size between the particles or species impeded by the nano-separators (such as nano-membranes), and the species that are supposed to pass through the nano-separators. We have discovered that certain dispersants, such as PVP, may have an elongated or needle-like structure. While the characteristic long dimension or diameter of such molecules is much too large to pass through the openings of nano-separators, and may be considerably larger than the silver nano-particles themselves, the characteristic narrow dimension or diameter of such molecules may be orders of magnitude smaller. Thus, the structure of the dispersant can be tailored to satisfy the process requirements for advantageously effecting a nano-separation of the dispersant from the silver nano-particles.

Thus, according to one preferred embodiment of the present invention, the PVP dispersant has at least one narrow characteristic dimension/diameter with respect to the silver particles and with respect to the characteristic diameter of the membrane openings. This narrow characteristic dimension/diameter of the dispersant is preferably less than half the average secondary particle size of the silver particles.

Thus, while the average molecular weight of the polyvinylpyrrolidone should typically have an average molecular weight of less than about 200,000 grams per mole, in order to pass through various suitable nano-membranes, the average molecular weight of the polyvinylpyrrolidone should preferably exceed about 8,000 grams per mole, to avoid reactivity and/or compatibility issues in either or both of the reaction steps. Despite the reduced separation efficiency, it is generally preferable for the PVP to have an average molecular weight of at least 15,000, at least 20,000, or even at least 25,000 grams per mole.

In some applications, e.g., in which extremely fine silver particles are produced, or in which elevated separation kinetics are desirable, the PVP should preferably have an average molecular weight of less than about 100,000 grams per mole, and more preferably, less than about 80,000 grams per mole.

Ceramic nano-filtration membranes have been advantageously employed, but polymeric and/or metallic nano-filtration membranes may also be fundamentally suitable. The membrane systems may be static or dynamic (e.g., having a vibrational mechanism for facilitating the separation).

Typical ceramic nano-separation or nano-filtration membranes for use in conjunction with the method of the present invention have one or more pores that are typically cylindrical, with a high length to width aspect ratio, through which the water/solvent and fine matter can pass through. In many cases, the membrane is typically shaped like a long cylinder, but other geometries may be practical.

We have found that nano-membranes having a pore diameter of less than 200 nanometers may be suitable for use in the process of the present invention. In some applications, the preferred pore diameter is less than 150 nanometers, less than 120 nanometers or less than 100 nanometers. Generally, the pore diameter or nominal pore diameter of the membrane may be at least 20 nanometers, and often, at least 30-50 nanometers, so as to enable various species to pass through the membrane openings, and so that the separation kinetics are not prohibitively slow.

According to another preferred embodiment of the present invention, the dispersant size and shape and the size of the membrane openings may be selected such that the silver nano-particles pass through the openings, while passage of the dispersant through the openings is hindered or substantially prevented.

Downstream of the separation step, much smaller membrane openings may be selected, such that the passage of the silver nano-particles through the openings is hindered or substantially prevented, while smaller molecules such as water, ethanol, etc., pass through the openings with relative facility. This embodiment of the present invention may be particularly efficacious in applications in which the average particle size of the silver product is particularly low, or in which a substantial fraction of the silver product has a low average secondary particle size (e.g., below 30 nanometers, or even below 50 nanometers).

In another preferred embodiment of the present invention, the formation of silver oxide and reduction of the silver oxide to produce the silver nano-crystals is performed in a single process step. However, the specific conditions and preferred reagents and dispersants are substantially similar to those provided hereinabove for the two-step reaction process. By way of example, an aqueous solution containing potassium hydroxide may be introduced under vigorous stirring to a second aqueous solution containing a soluble silver compound such as silver nitrate, a dispersant such as PVP, and a reducing agent such as a hydrogen peroxide. In this case, the reduction of the silver ions only commences when the hydroxide solution mixes with the second aqueous solution.

EXAMPLES

Reference is now made to the following Examples, which together with the above description, illustrate the invention in a non-limiting fashion.

The chemicals used in effecting these Examples are identified hereinbelow:
AgNO₃-Aldrich
AgNO₃ (containing 63.6% Ag)-Saxonia (Germany)
KOH-Aldrich
hydrogen peroxide (aqueous solution of ~33%)-Makhteshim (Israel)
polyvinylpyrrolidone (PVP), MW=55,000-Aldrich.
polyvinylpyrrolidone (PVP), MW=8,000-Aldrich.
anti-foaming agent Contraspum 1012-Zschimmer & Schwarz (Germany)
ethanol abs.-Aldrich
isopropyl alcohol (IPA)-Aldrich
tripropyleneglycol methyl ether (TPM)-Aldrich
butyl carbitol acetate (BCA)-Aldrich
caprylic acid-Aldrich
Epoxy XY8000-Japan Epoxy Resins Co., Ltd. (Japan).
Epoxy XY8000 may be identified by CAS No. 30583-72-3, and has the chemical name cyclohexanol, 4,4-(1-methylethylidene)bis-, polymer with (chloromethyl)oxirane.

Aqueous solutions were prepared by using deionized water using an Ionex water purification system (PuriTech, Dessel, Belgium). All reagents and solvents were used without further purification.

The instruments used in conjunction with the Examples are identified hereinbelow:

Particle size analyses ($d_{50}$) were performed using a Brookhaven 90 Plus particle size analyzer (Brookhaven Instruments Corporation, Holtsville, N.Y.).

The particle size analysis ($d_{50}$) in Example 3 was performed using a Malvern Master Sizer 2000.

High Resolution Scanning Electron Microscopy (HRSEM) images were generally obtained using an HRSEM Ultra Plus Zeiss Gemini (Inlens Detector).

Electron Back Scattered Diffraction (EBSD) Patterns were obtained using an E-SEM Quanta™ 200 (FEI, Hillsboro, Oreg.). The instrument was equipped with an attachment for orientation image microscopy (OIM) Channel 5 (Oxford Instruments, England).

Evaporation was performed using a R-215 Rotavapor® equipped with a heating bath (BÜCHI Labortechnik AG, Flawil, Switzerland).

Filtration of dispersions was conducted by using a membrane system that included ceramic membranes (JM Separations BV, The Netherlands).

Example 1

52 g AgNO₃ and 3.3 g PVP (MW=55,000) were dissolved in a mixture of 780 ml ethanol and 80 ml water (solution A). 17 g KOH were dissolved in 140 ml water (solution B). Solution B was poured into solution A under vigorous stirring in an ultrasonic bath, forming a colloidal precipitate of Ag₂O at ambient temperature. After stirring the dispersion for 10 minutes, 180 ml H₂O₂ (33%) were slowly pumped into the dispersion under stirring at the temperature range between about 25° C. to about 60° C., forming silver nanoparticles. The dispersion was stirred for additional 15 minutes, and was transferred to a storage tank to await further treatments.

A particle size analysis yielded an average particle size ($d_{50}$) of about 80 nanometers.

Example 2

53 g AgNO₃ and 54 g PVP (MW=55,000) were dissolved in 860 ml water (solution A). Five drops of an anti-foaming agent were also introduced. 17 g KOH were dissolved in 140 ml water (solution B). Solution B was poured into solution A under vigorous stirring at ambient temperature, forming a colloidal, nanometric precipitate of Ag₂O ($d_{50}$ under 60 nanometers). After stirring the dispersion for 10 minutes, 180 ml H₂O₂ (33%) were slowly pumped directly into the dispersion under stirring, in situ, reducing the silver oxide to silver, at which time the reaction mixture heated up from about 25° C. to about 60° C. The dispersion was stirred for an additional 15 minutes, and was transferred to a storage tank to await further treatments.

A particle size analysis of the silver particles yielded an average particle size ($d_{50}$) of about 50 nanometers.

Example 3

Two liters of an aqueous solution containing 170 g/l AgNO₃ and 90 g/l hydrogen peroxide (33%) were dripped, under intensive stirring, into one liter of aqueous solution of KOH having a concentration of 56 g/l, at which time the reaction mixture heated up from about 25° C. to about 60° C. The silver particles produced were agglomerates.

A particle size analysis yielded an average particle size ($d_{50}$) of about 1.5 microns (1500 nanometers).

Example 4

One liter aqueous solution of KOH having a concentration of 56 g/l was dripped, under intensive stirring, into two liters of an aqueous solution containing 170 g/l $AgNO_3$, 90 g/l hydrogen peroxide (33%), and 170 grams PVP (MW=55,000). During the reaction, the temperature increased in the range between about 25° C. to about 60° C. The dispersion was stirred for an additional 15 minutes, and was transferred to a storage tank to await further treatments.

A particle size analysis of the silver particles yielded an average particle size ($d_{50}$) of about 90 nanometers.

Example 5

53 g $AgNO_3$ and 100 g PVP (MW=8,000) were dissolved in 850 ml water (solution A). Five drops of an anti-foaming agent were also introduced. 17 g KOH were dissolved in 140 ml water (solution B). Solution B was poured into solution A under vigorous stirring, forming a colloidal nanometric precipitate of $Ag_2O$. After stirring the dispersion for 10 minutes, 180 ml $H_2O_2$ (33%) were slowly pumped directly into the dispersion under stirring, in situ, reducing the silver oxide to silver at the temperature range between about 25° C. to about 60° C.

The silver particles produced were agglomerates.

Example 6

Example 2 was repeated, but using three-fold quantities. 159 g $AgNO_3$ and 162 g PVP (MW=55,000) were dissolved in 2580 ml water (solution A). Fifteen drops of an anti-foaming agent were also introduced. 51 g KOH were dissolved in 420 ml water (solution B). Solution B was poured into solution A under vigorous stirring, forming a colloidal nanometric precipitate of $Ag_2O$. After stirring the dispersion for 10 minutes, 540 ml $H_2O_2$ (33%) were slowly pumped directly into the dispersion under stirring, in situ, reducing the silver oxide to silver at a temperature range between 25° C. and about 60° C. The dispersion was stirred for an additional 15 minutes, and was transferred to a storage tank to await further treatments.

A particle size analysis of the silver particles produced yielded an average particle size ($d_{50}$) of about 50 nanometers of a relatively narrow distribution.

Example 7: Concentrating a Dispersion 1000 ml of the product dispersion from Example 6, containing about 25 g of the nanometric silver particles, were pumped out from the top of the storage tank at which it was kept without any mixing, to assure that large particles, if any are therein, are precipitated onto the bottom of the storage tank, and are avoided in the subsequent treatments. The dispersion was washed in a membrane separation system by feeding gradually and continuously about 20 liters water into the membrane system, and simultaneously, by gradually and continuously withdrawing a similar volume of spent wash liquor from the membrane system in such a manner that the concentration of the silver particles, never exceeded 90% (and preferably less than 60%), on a weight basis. The membrane system included ceramic membranes (JM Separations BV) having separation pores or capillaries having a nominal pore diameter of 100 nanometers. Water was added, and ionic matter and dispersant, selectively, passed through the membranes, leaving the nanometric silver particles in the dispersion.

The washing process was continued until the salts in the dispersion were, practically eliminated, and the dispersant was reduced to a preset concentration of 3% of the weight of the silver particles.

As the mass balance of the water feed to the membrane system and the spent wash liquor flowing out of the membrane system was, deliberately, changed along this washing step in order to effect an efficient washing operation, and in order to obtain a concentrated dispersion, the resulting washed silver dispersion contained about 25% solids, on a weight basis. A particle size analysis of the washed silver particles yielded an average particle size ($d_{50}$) of about 50 nanometers; no significant change in particle size between the unwashed and washed nano-silver product was observed.

Figure 2:
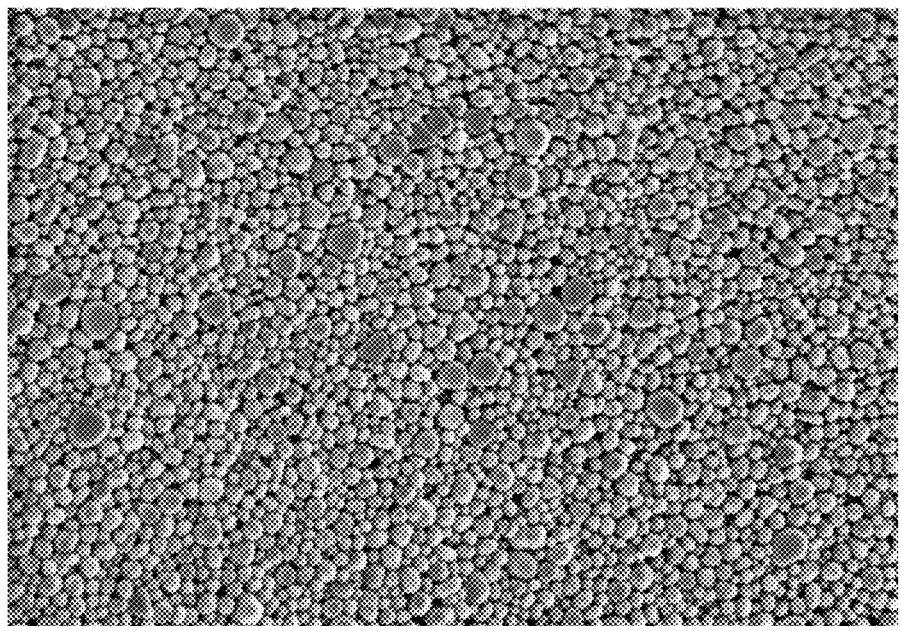
FIG. 2 is a High-Resolution Scanning Electron Microscopy (HRSEM) image showing a typical field containing nanometric silver particles produced according to an embodiment of the present invention, described in Example 7.
Figure 3:
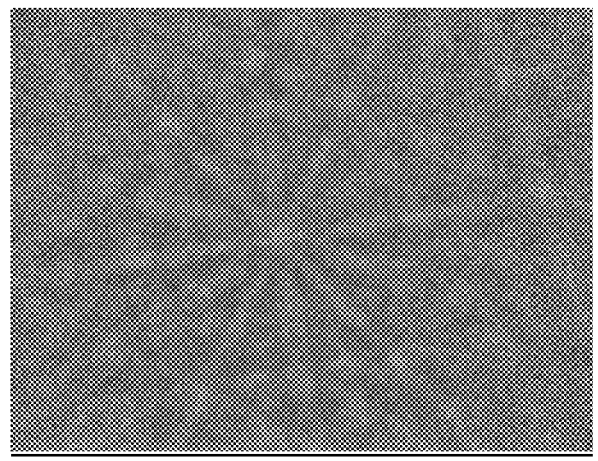
FIG. 3 is an Electron Back Scattered Diffraction (EBSD) pattern of the nanometric silver particles produced according the embodiment described in Example 7.

The HRSEM image of the nanometric particles obtained is provided in FIG. 2 (instrument magnification=×100,000; image viewing magnification=×40000), and the Electron Back Scattered Diffraction (EBSD) pattern of these silver particles is given in FIG. 3. These figures reveal the following characteristics with regard to the silver particles:

1. A majority of single-crystal silver particles (typically, at least 70%, at least 80%, or at least 90%, as determined by EBSD correlation);
2. The single-crystal particles include particles having triangular faces, square faces, hexagonal faces, and heptagonal faces; and
3. The single-crystal particles having triangular faces represent at least 2%, at least 5%, and typically, between 2% to 15% of the silver particles, based on the number of particles (determined by manual counting of particles in SEM fields).

Example 8: Replacing Water with a Volatile Organic Solvent (Water-Ethanol Solvent Exchange)

A 1000 ml portion of a dispersion of silver particles in water, containing about 150 g of the silver particles, which was prepared in a similar manner to that in Example 7, was concentrated to 500 ml using the same membrane separation system as in Example 7. 400 ml ethanol were then added, and the dispersion was concentrated once again to 500 ml by withdrawing the requisite volume of liquid. This cycle, in which 400 ml ethanol is added and about 400 ml ethanol-water mixture is withdrawn, was repeated until the concentration of the ethanol reached 94%-95% by weight (which is close to the composition of an azeotropic mixture of ethanol-water). The resulting 500 ml silver dispersion contained about 150 g of nanometric silver and about 300 g of the ethanol-water mixture.

A particle size analysis of the silver dispersion after the water-ethanol exchange yielded an average particle size ($d_{50}$) of about 80 nanometers.

A majority of the particles obtained were monocrystals.

Example 9: Replacing Water with a Volatile Organic Solvent (IPA)

Example 8 was repeated with isopropyl alcohol (IPA) instead of ethanol.

A particle size analysis of the silver dispersion after the water-isopropyl alcohol exchange yielded an average particle size ($d_{50}$) of about 90 nanometers.

A majority of the particles obtained were monocrystals.

Example 10: Replacing the Volatile Organic Solvent with an Organic Non-Volatile Solvent (Ethanol-TPM Solvent Exchange)

The 500 ml of silver dispersion from Example 8, containing about 150 g of silver particles and about 300 g of solvent (ethanol-water mixture), were transferred into a 1-liter flask. 150 g tripropyleneglycolmethylether (TPM) were added to the flask (in order to ultimately obtain a final dispersion containing about 50% solids, on a weight basis). The flask was connected to a Rotavapor® apparatus, and the ethanol was evaporated under vacuum (at 20 mm Hg; 60° C.; 80 rpm). The resulting silver dispersion in TPM contained 49.5% (by weight) silver with an average particle size ($d_{50}$) of about 50 nanometers (as well as traces of ethanol and water). This specific dispersion displayed a shelf-life exceeding one year (and exceeding even two years). Moreover, after drying and thermal sintering, the specific resistivity, as measured according to the ASTM standard procedure F390-98, was below $4 \times 10^{-6}$ ohm·cm, which is considered to be an excellent value for applications such as conductive inks.

Figure 4:
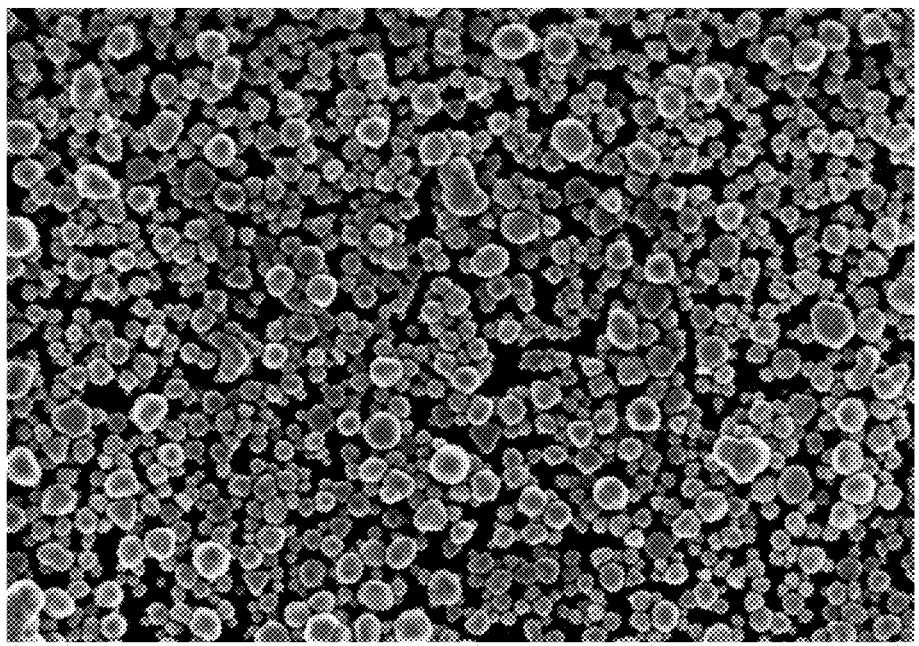
FIG. 4 is a High-Resolution Scanning Electron Microscopy (HRSEM) image showing a typical field containing nanometric silver particles produced according to an embodiment of the present invention described in Example 10.

A HRSEM image showing the nanometric silver particles obtained is provided in FIG. 4 (instrument magnification=×100,000; image viewing magnification=×40000). It is evident that the general appearance of the silver particles has not been noticeably changed with respect to that of the particles obtained in Example 7.

The viscosity of the dispersion was measured, for various concentrations of silver particles (metal loading). The results are provided in Table 1.

TABLE 1

| | Metal loading (%)* | | | | | | |
|---|---|---|---|---|---|---|---|
| | 45 | 48 | 49 | 50 | 53 | 55 | 59 |
| Viscosity at 25° C. (cP) | 30 | 40 | 50 | 60 | 85 | 140 | 460 |

*Metal loading % is defined as the weight of metal (silver) particles × 100 divided by the weight of the dispersion.

Example 11: Replacing the Volatile Organic Solvent (IPA) with an Organic Solvent-BCA (IPA-BCA Solvent Exchange)

The 500 ml of silver dispersion from Example 9, containing about 150 g of silver particles and about 300 g of solvent (IPA-water mixture) were transferred into a 1-liter flask. 150 g butyl carbitol acetate (BCA) were added to the flask (in order to obtain, eventually, a final dispersion containing about 50% solids, on a weight basis). The flask was connected to a Rotavapor® apparatus, and the IPA was evaporated under vacuum (at 20 mm Hg, 60° C., and 80 rpm). The resulting silver dispersion in BCA contained 49.7% (by weight) silver particles having an average particle size ($d_{50}$) of about 60 nanometers. The silver dispersion also contained traces of IPA and water.

Example 12: Replacing the Volatile Organic Solvent (IPA) with an Epoxy Resin (IPA-Epoxy Resin Exchange)

The 500 ml of silver dispersion from Example 9, containing about 150 g of silver particles and about 300 g of solvent (IPA-water mixture), were transferred into 1 liter flask, and 15 g caprylic acid were added. The flask was connected to a Rotavapor® apparatus, which was rotated for 15 minutes at 80° C., at 80 rpm). Subsequently, 150 g Epoxy XY8000 resin were added to the flask (in order to obtain, eventually, a final dispersion containing about 50% solids, on a weight basis). The Rotavapor was reactivated (at 20 mm Hg, 80° C., and 80 rpm), and after 1 hour, most of the IPA-water solvent was evaporated.

The resulting silver dispersion in the epoxy resin contained 48% (by weight) silver particles having an average particle size ($d_{50}$) of about 70 nanometers. The silver dispersion also contained traces of IPA and water.

A majority of the particles obtained were monocrystals.

Example 13

The presence of monocrystals was qualitatively demonstrated by means of Electron Back Scattered Diffraction (EBSD).

EBSD produces a diffraction pattern from the surface of the sample of silver nanoparticles. The procedure, which will be readily understood to those of ordinary skill in the art of EBSD, is as follows:

1. The sample is scanned using a scanning electron microscope (SEM) Quanta™ 200, typically at a working distance of 18 mm, and at 20 KeV, to obtain a diffraction pattern or image. The spot size is 4.5; the probe current is about 0.5 nA; the collection time for EBSD pattern: 300 msec; integration: 50.
2. Interpretation of the diffraction image is performed using the instrument software (comparing basic silver crystallographic data);
3. The "solution" of the diffraction is matched, depicting the orientation of the crystal, correlating every kikuchi line to its fitting crystallographic plane in the lattice. If there is a perfect match between the kikuchi lines and the crystallographic planes (according to the theoretical data), the diffraction determines the orientation of a single crystal.

In the case of nanometric silver particles, a perfect solution may not always be obtained; sometimes there is no solution at all. This may indicate that the beam is located on a grain boundary. Alternatively, a perfect solution may not be obtained when the beam is located between two grains.

Example 14

Following the basic procedure of Example 13, we quantified the presence of nanometric silver monocrystals within each sample of nanometric silver. Quantification was achieved by performing a plurality (at least 5, and preferably at least 10) of scans at randomly chosen points. In testing the various dispersions of the present invention, at least 30% or at least 50% of the scans produce a substantially perfect match for a silver single crystal. More typically, at least 80%, at least 90%, or substantially 100% of the scans produce a substantially perfect match for a silver single crystal.

We have found that if at least 30% of the scans produce a substantially perfect match for a silver single crystal, then a majority of the nanometric silver particles are monocrystalline (based on the number of particles). If at least 50% of the scans produce a substantially perfect match for a silver single crystal, then at least 60%, and typically at least 70% of the nanometric silver particles are monocrystalline. If at least 60% of the scans produce a substantially perfect match for a silver single crystal, then at least 70%, and typically at least 80% of the nanometric silver particles are monocrystalline. If at least 80% of the scans produce a substantially perfect match for a silver single crystal, then at least 90%, and typically at least 95% of the nanometric silver particles are monocrystalline.

In theory, these quantitative EBSD scanning methods may provide a quantitative evaluation of a top layer or cross-section of the sample. In practice, however, this quantitative evaluation closely reflects the fraction of silver particles having monocrystalline character, particularly for samples that do not have an extremely broad particle size distribution.

Example 15

Figure 5:
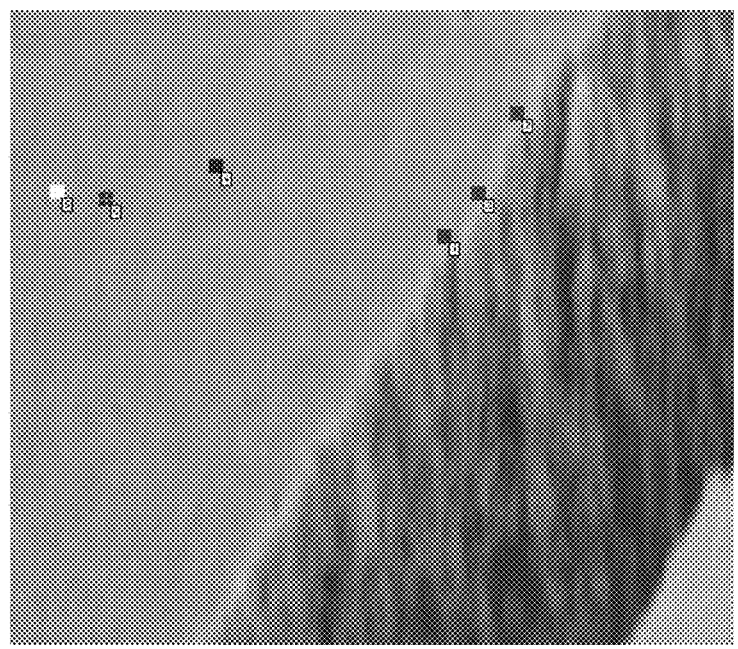
FIG. 5 is a SEM image of a sample containing nanometric silver particles, produced according to the present invention, showing six locations selected for EBSD scanning.

FIG. 5 is a SEM image of a sample containing nanometric silver particles, produced according to the present invention. Randomly chosen locations in the sample were scanned. In five of the six locations, a perfect match for a silver single crystal was obtained.

Figure 6:
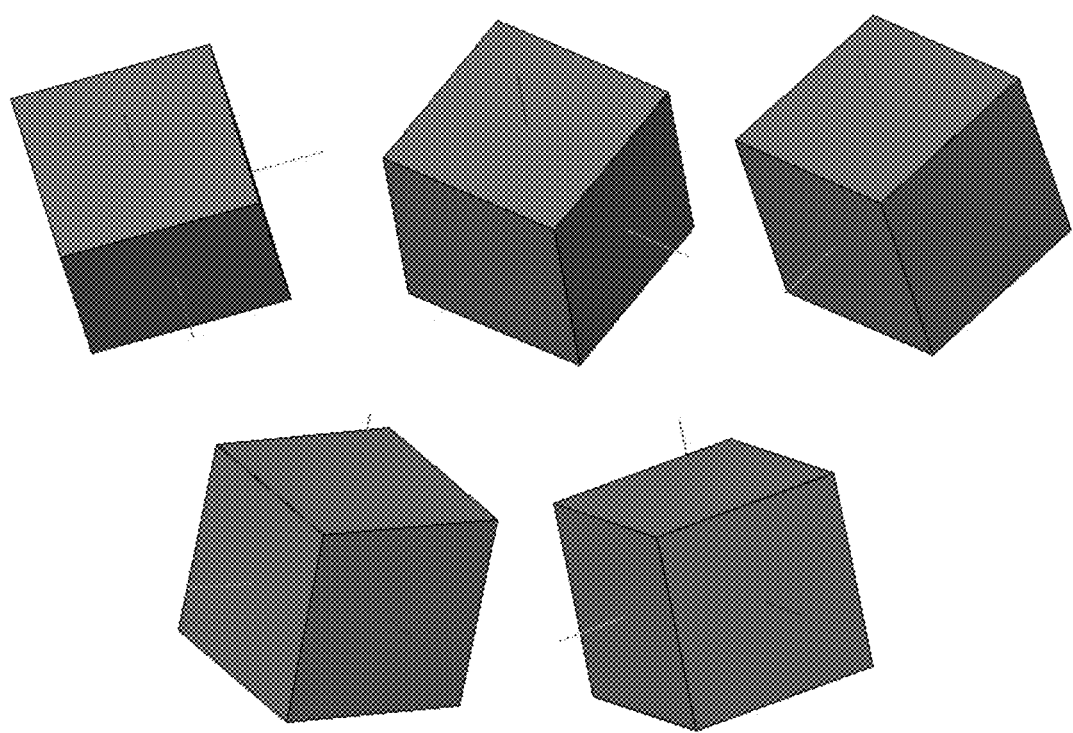
FIG. 6 provides five illustrations of the 3D crystal orientation for the five locations in FIG. 5 in which monocrystalline particulate matter was positively identified.

FIG. 6 provides five illustrations of the 3D crystal orientation for the five locations in which a perfect match was obtained. Each one of the diffractions produced had a different orientation. Moreover, the orientation distribution obtained was very close to the theoretical random distribution, indicating that no preferred orientation in the nanometric silver particles of the sample.

Example 16

Inventive dispersions of silver particles were prepared for specific resistivity testing as follows:

The dispersion is dropped on a glass substrate having dimensions of ~3 cm×3 cm, by means of a pipette, until the substrate is fully covered. Heat treatment (in air) is effected at 130° C. for 10 minutes, followed by 640° C. for 20 minutes. The thermally-sintered sample is immediately removed from the oven. Typically, the film thickness is about 10 micrometers.

Using a four-point probe measurement, the specific resistivity is obtained.

Example 17

An inventive dispersion of silver particles in tripropyleneglycol monomethyl ether (TPM) was prepared for specific resistivity testing according to the procedure provided in Example 16. The sample had a metal loading of approximately 50%.

The specific resistivity, determined according to the procedure provided in Example 16, was about $3.5 \times 10^{-6}$ ohm·cm, just slightly more than twice the specific resistivity of bulk silver.

The term "average secondary particle size", used herein, in the specification and in the claims section that follows, is used with regard to the silver oxide and the silver particles, and refers to the mean diameter of the silver oxide and silver particles, and is specifically meant to include the diameters of agglomerated particles.

As used herein in the specification and in the claims section that follows, the term "mean diameter", used with regard to silver oxide and silver particles, refers to an equivalent spherical particle size ($d_{50}$), calculated using the Stokes-Einstein equation, by a Brookhaven 90 Plus particle size analyzer (Brookhaven Instruments Corporation, Holtsville, N.Y.), or if unavailable, by a functionally-equivalent particle size analyzer suited for measuring equivalent spherical particle size throughout the range of 5 to 2000 nanometers.

In determining this mean diameter, the particle size analysis is performed in a professional and reproducible manner using the particle size analyzer, by personnel trained and qualified to operate the particle size analyzer, and under the following conditions:

(1) a representative sample of the solid particles (silver oxide, silver) is taken;
(2) the analysis is performed in a dispersion of the solid particles in its respective liquid;
(3) the analysis is performed at room temperature;
(4) the scattering angle is 90 degrees.

As used herein in the specification and in the claims section that follows, the term "polyvinylpyrrolidone", also known as PVP, refers to a water-soluble polymer having or including the following molecular structure:

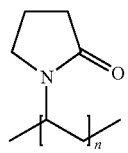

PVP is typically made from the vinyl pyrrolidone monomer, which has the following structure:

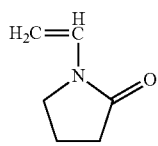

The market of PVP dispersants includes polymers produced by attaching (e.g., grafting) PVP onto other moieties. As used herein in the specification and in the claims section that follows, the term "polyvinylpyrrolidone" includes such dispersants.

As used herein in the specification and in the claims section that follows, the term "silver compound", and the like, is meant to include an inorganic silver salt, an organic silver salt, or an organo-silver complex.

As used herein in the specification and in the claims section that follows, the term "soluble silver compound", and the like, refers to a silver compound having a solubility of at least 10 grams/liter in water or in ethanol at 25° C. Preferably, the soluble silver compound has a solubility of at least 25 grams/liter in water or in ethanol at 25° C., and more preferably, a solubility of at least 50 grams/liter in water or in ethanol at 25° C.

As used herein in the specification and in the claims section that follows, the term "volatile solvent", such as an organic volatile solvent, refers to a solvent that, in pure form, has a boiling point below 105° C., and typically 100° C. or less, at atmospheric or ambient pressure.

As used herein in the specification and in the claims section that follows, the term "non-volatile solvent", such as an organic non-volatile solvent, refers to a solvent that, in pure form, has a boiling point above 105° C., and typically above 110° C., at atmospheric or ambient pressure.

As used herein in the specification and in the claims section that follows, the term "single-crystal" "monocrystal", and the like, with respect to silver particles, refers to a single-crystal silver particle as determined by the standard Electron Back Scattered Diffraction (EBSD) method described in Example 13 hereinabove. Any quantitative assessment of a fraction or percentage of single-crystal particles within a sample, as used herein in the specification and in the claims section that follows, may be performed according to the quantitative EBSD determination method described in Example 14. While in theory, this quantitative EBSD scanning method provides a quantitative evaluation of a top layer or cross-section of the sample, in practice, this quantitative evaluation closely reflects the fraction of silver particles having monocrystalline character, particularly for samples that do not have an extremely broad particle size distribution.

Thus, as used herein in the specification and in the claims section that follows, the term "majority", with respect to silver particles, refers to at least one of the following: at least 30% of the randomly-selected EBSD scans produce a substantially perfect match for a silver single crystal, according to the procedure described in Example 14, or more than 50% of the silver particles, based on the number of silver particles.

As used herein in the specification and in the claims section that follows, the term "standard sintering" or "standard thermal sintering" refers to the sintering procedure described in Example 16.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination. Similarly, the content of a claim depending from one or more particular claims may generally depend from the other, unspecified claims, or be combined with the content thereof, absent any specific, manifest incompatibility therebetween.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification, including U.S. Pat. No. 6,277,169 and WO Patent Publication No. 2003/080231, are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method for producing a dispersion of nanometric silver particles, the method comprising the steps of:
   (a) reacting at least one soluble silver compound with an alkali metal hydroxide in an aqueous medium, in a presence of a first dispersant, to produce silver oxide solids having an average secondary particle size below 1200 nanometers;
   (b) reacting said silver oxide solids with at least one reducing agent in an aqueous medium, in a presence of a second dispersant, to produce a first dispersion of silver particles, the silver particles having an average secondary particle size below 300 nanometers; and
   (c) removing at least a portion of said aqueous medium of step (b) from the silver particles to produce the dispersion of the nanometric silver particles;

wherein said alkali metal hydroxide and said at least one soluble silver compound react in a stoichiometric ratio of said alkali metal hydroxide to said at least one soluble silver compound, and wherein quantities of said alkali metal hydroxide and said at least one soluble silver compound are added to said aqueous medium in a particular ratio that is at most 0.98 moles of said alkali metal hydroxide to one mole of said at least one soluble silver compound;

wherein a concentration of said silver particles within said first dispersion is within a range of 0.5% to 5%, by weight of said first dispersion;

wherein a concentration of said nanometric silver particles within the dispersion of the nanometric silver particles is within a range of 35% to 75%, by weight;

and wherein more than 50% by weight of the nanometric silver particles are single-crystal silver particles.

2. The method of claim 1, further comprising the step of further concentrating the silver particles within the dispersion of the nanometric silver particles produced in step (c), to form a second dispersion.

3. The method of claim 1, wherein step (c) includes washing and concentrating the silver particles, whereby the aqueous medium is partially removed from the silver particles, to form a concentrate, the concentrate containing most of the silver particles that were present in said first dispersion.

4. The method of claim 1, further comprising the step of replacing most of said aqueous medium by at least one volatile organic solvent.

5. The method of claim 1, wherein said concentration of said nanometric silver particles within the dispersion of the nanometric silver particles is within a range of 45% to 75%, by weight.

6. The method of claim 1, wherein a concentration of said second dispersant within the dispersion of the nanometric silver particles is within a range of 0.2% to 30% of said concentration of said nanometric silver particles, by weight.

7. The method of claim 6, wherein said concentration of said second dispersant within the dispersion of the nanometric silver particles is at most 5% of said concentration of said nanometric silver particles, by weight.

8. The method of claim 1, wherein, subsequent to step (c), the dispersion of the nanometric silver particles is aged for 6 months, and wherein more than 50% by weight of the nanometric silver particles remain single-crystal silver particles.

9. The method of claim 8, wherein said second dispersant is, or includes, said first dispersant.

10. The method of claim 1, wherein said first and second dispersants are selected from the group of dispersants consisting of a polyvinylpyrrolidone (PVP), gum arabic, polyvinyl alcohol (PVA), polyacrylic acid (PAA), polyallylamine (PAAm), polysodium styrene sulfonate (PSS), 3-(aminopropyl)trimethoxysilane (APS), a fatty acid, lauryl amine, cetyltrimethylammonium bromide (CTAB), and tetraoctylammonium bromide (TOAB).

11. The method of claim 10, wherein said reducing agent is selected from the group consisting of peroxides and sodium borohydride.

12. A method for producing a dispersion of nanometric silver particles, the method comprising the steps of:

(a) reacting at least one soluble silver compound with an alkali metal hydroxide in an aqueous medium, in a presence of a first dispersant, to produce silver oxide solids having an average secondary particle size below 1200 nanometers;

(b) reacting said silver oxide solids with at least one reducing agent in an aqueous medium, in a presence of a second dispersant, to produce a first dispersion of silver particles, the silver particles having an average secondary particle size below 300 nanometers; and (c) removing at least a portion of said aqueous medium of step (b) from the silver particles to produce the dispersion of the nanometric silver particles;

wherein said alkali metal hydroxide and said at least one soluble silver compound react in a stoichiometric ratio of said alkali metal hydroxide to said at least one soluble silver compound, and wherein quantities of said alkali metal hydroxide and said at least one soluble silver compound are added to said aqueous medium in a particular ratio that is at most 0.98 moles of said alkali metal hydroxide to one mole of said at least one soluble silver compound;

wherein a concentration of the silver particles within said first dispersion is within a range of 0.5% to 5%, by weight of said first dispersion;

and wherein more than 50% by weight of the nanometric silver particles are single-crystal silver particles.

13. The method of claim 12, wherein said particular ratio is within a range of 0.80 to 0.98 moles of said alkali metal hydroxide to one mole of said at least one soluble silver compound.

14. The method of claim 12, wherein said particular ratio is within a range of 0.80 to 0.96 moles of said alkali metal hydroxide to one mole of said at least one soluble silver compound.

15. A method for producing a dispersion of nanometric silver particles, the method comprising the steps of:

(a) reacting at least one soluble silver compound with an alkali metal hydroxide in an aqueous medium, in a presence of a first dispersant, to produce silver oxide solids having an average secondary particle size below 1200 nanometers;

(b) reacting said silver oxide solids with at least one reducing agent, in an aqueous medium, in a presence of a second dispersant, to produce a first dispersion of silver particles, the silver particles having an average secondary particle size below 120 nanometers;

wherein said alkali metal hydroxide and said at least one soluble silver compound react in a stoichiometric ration of said alkali metal hydroxide to said at least one soluble silver compound, and wherein quantities of said alkali metal hydroxide and said at least one soluble silver compound are added to said aqueous medium in a particular ratio that is at most 0.98 moles of said alkali metal hydroxide to one mole of said at least one soluble silver compound, and (c) removing at least a portion of said aqueous medium of step (b) from the silver particles to produce the dispersion of the nanometric silver particles;

wherein a concentration of the nanometric silver particles within the dispersion is within a range of 35% to 75%, by weight;

and wherein a concentration of the silver particles within said first dispersion is within a range of 0.5% to 5%, by weight of said first dispersion.

16. The method of claim 15, wherein said concentration of the silver particles within said first dispersion is at least 1%, by weight.

17. The method of claim 15, wherein said removing at least a portion of said aqueous medium includes:

replacing at least 50% by volume of said aqueous medium by at least one volatile organic solvent; followed by (ii) replacing at least 50% by volume of said at least one volatile organic solvent by at least one non-volatile organic solvent.

18. The method of claim 15, wherein said concentration of the nanometric silver particles within the dispersion is within a range of 45% to 75%, by weight.

19. The method of claim 15, wherein said particular ratio is within a range of 0.80 to 0.98 moles of said alkali metal hydroxide to one mole of said at least one soluble silver compound.

20. The method of claim 15, wherein said particular ratio is within a range of 0.80 to 0.96 moles of said alkali metal hydroxide to one mole of said at least one soluble silver compound.

* * * * *